United States Patent
Ghiani (10) Patent No.: US 8,651,092 B2
(45) Date of Patent: Feb. 18, 2014

(54) GAS COOLER FOR AN INTERNAL COMBUSTION ENGINE

(75) Inventor: Franco Ghiani, Bietigheim-Bissingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 13/405,647

(22) Filed: Feb. 27, 2012

(65) Prior Publication Data

US 2012/0210986 A1    Aug. 23, 2012

Related U.S. Application Data

(63) Continuation of application No. PCT/EP2010/061375, filed on Aug. 4, 2010.

(30) Foreign Application Priority Data

Aug. 26, 2009  (DE) .......................... 10 2009 038 592

(51) Int. Cl.
 *F02B 29/04*  (2006.01)
 *F02M 25/07*  (2006.01)

(52) U.S. Cl.
 USPC ........................................................ 123/542

(58) Field of Classification Search
 USPC ................................................. 123/542, 563
 See application file for complete search history.

(56) References Cited

U.S. PATENT DOCUMENTS

| | | | |
|---|---|---|---|
| 3,881,455 A * | 5/1975 | Belsanti ......................... | 123/563 |
| 4,436,145 A * | 3/1984 | Manfredo et al. .............. | 165/67 |
| 4,474,162 A * | 10/1984 | Mason ........................... | 123/563 |
| 4,476,842 A * | 10/1984 | Belsanti ......................... | 123/563 |
| 6,293,264 B1 * | 9/2001 | Middlebrook ................. | 123/563 |
| 7,077,113 B2 * | 7/2006 | Bilek et al. ..................... | 123/563 |
| 2001/0027857 A1 * | 10/2001 | Emrich et al. ............. | 165/109.1 |
| 2003/0131977 A1 | 7/2003 | West | |
| 2003/0196785 A1 | 10/2003 | Knecht et al. | |
| 2005/0061026 A1 | 3/2005 | Choi | |
| 2005/0081523 A1 * | 4/2005 | Breitling et al. ................ | 60/599 |
| 2006/0081225 A1 * | 4/2006 | Yi .................................... | 123/563 |
| 2007/0181105 A1 * | 8/2007 | Bazika ........................... | 123/563 |
| 2010/0071871 A1 | 3/2010 | Gaensler et al. | |
| 2010/0089548 A1 | 4/2010 | Braic et al. | |
| 2011/0088663 A1 * | 4/2011 | Dehnen et al. ................. | 123/542 |

FOREIGN PATENT DOCUMENTS

| | | |
|---|---|---|
| DE | 102 14 467 A1 | 10/2003 |
| DE | 10 2007 010 474 A1 | 7/2008 |
| DE | 10 2007 010 134 A1 | 9/2008 |
| DE | 10 2008 018 594 A1 | 10/2008 |
| EP | 0 578 916 A2 | 1/1994 |
| EP | 1 707 896 A2 | 10/2006 |
| WO | WO 03/091650 A1 | 11/2003 |

\* cited by examiner

*Primary Examiner* — M. McMahon
(74) *Attorney, Agent, or Firm* — Muncy, Geissler, Olds & Lowe, PLLC (57) ABSTRACT

A gas cooler for an internal combustion engine is provided that includes a gas duct through which a gas flow supplied to the internal combustion engine can flow in a flow direction, and having a heat exchanger which is inserted into the gas duct through a lateral opening in an insertion direction, wherein a fluid or cooling the gas flow can flow through the heat exchanger, and wherein a first profile which runs in the insertion direction is formed on at least one side of the heat exchanger, which first profile meshes with a second profile provided on the gas duct.

3 Claims, 7 Drawing Sheets

GAS COOLER FOR AN INTERNAL COMBUSTION ENGINE

This nonprovisional application is a continuation of International Application No. PCT/EP2010/061375, which was filed on Aug. 4, 2010, and which claims priority to German Patent Application No. DE 10 2009 038 592.4, which was filed in Germany on Aug. 26, 2009, and which are both herein incorporated by reference.

BACKGROUND OF THE INVENTION

1. Field of the Invention

The invention concerns a gas cooler for an internal combustion engine.

2. Description of the Background Art

So-called indirect intercoolers are known from the practice of motor vehicle construction, which include a heat exchanger through which a coolant flows, said heat exchanger being inserted through an opening into a charge air duct. The heat exchanger extends through the charge air duct and the charge air flows through the heat exchanger.

SUMMARY OF THE INVENTION

It is an object of the invention to providey a gas cooler for an internal combustion engine, the heat exchanger of which is especially simple to install.

Precisely positioned and guided insertion of the heat exchanger is made possible by means of the mutually meshing profiles on the heat exchanger and the gas duct. Moreover, good sealing against leakage flows in the edge regions of the heat exchanger can also be achieved at the same time by means of the profiles.

A gas flow within the meaning of an embodiment of the invention can be understood to mean any gas supplied to the internal combustion engine, in particular charge air, recirculated exhaust gas, or a mixture of exhaust gas and charge air. In this context, the gas duct can be made of plastic or metal, for example aluminum, depending on the intended temperatures and pressures. Insofar as reference is made in the present document to a gas cooler, this does not exclude types of operation in which the heat exchanger is used for heating the gas.

In an embodiment of the invention, the heat exchanger can be designed as a soldered stack of flat tubes. In an especially preferred detail design of this embodiment, the first profile is formed on a side part soldered to the end of the stack. Such side parts can be made of materials such as aluminum sheets, and are often provided as sheets terminating a stack of flat tubes, for example to protect the generally thin-walled outer flat tubes. A first profile in the meaning of the invention can thus be provided by simple profiling or forming of such a side part.

In an embodiment of the invention, the flat tubes can open into one header at each of their two ends, so that a redirection of the fluid, or else a design as an I-flow exchanger, is easily possible. In an advantageous detail design, a front header in the insertion direction is supported on a second opening in the gas duct located opposite the lateral opening. In particular, in this design at least one connection for the fluid can be implemented on the front header. On the whole, great flexibility in the layout of the heat exchanger with regard to the location of the fluid connections and/or the layout of the flow type (I-flow or U-flow) can be achieved by this means.

In an embodiment that is an alternative hereto, the heat exchanger has only one header, wherein a redirection of the fluid takes place in each case within the flat tubes. In such an embodiment, which has an especially small number of components, the ends of the flat tubes opposite the header can be accommodated in a corresponding recess in the gas duct in order to avoid gas leakage flows.

For a simple and economical connection of the heat exchanger and the gas duct, a base of the heat exchanger can have a profiling at its edge that in a preferred detail design is U-shaped, wherein the profiling engages around a protruding edge of the opening of the gas duct. Moreover, a seal, for example an O-ring seal, can be located in the profiling.

In an embodiment, an elastic sealing lip can be provided on at least one of the profiles, preferably on the second profile, to make contact with the respective other profile for especially gas-tight guidance and damping or sealing in the event of vibrations. Depending on the requirements, the sealing lip can be implemented either as an insertable seal or as a single-piece forming of the gas duct. In the case of single-piece forming, the sealing lip can be formed as a sufficiently thin tail of the gas duct, wherein the gas duct is made of a suitable plastic. However, it can also be a sealing lip that is injection-molded onto the gas duct, so that a one-piece, but not single-material, forming is provided.

The second profile can be provided in a lower region of the gas duct in the direction of gravity, wherein the second profile forms a sump for receiving condensate. In this way, several functions are combined in the second profile.

In an embodiment of the invention, the heat exchanger can be secured on the gas duct by positive latching, in especially preferred embodiments by means of claws, a corrugated slot flange, or snap-in fastening techniques. In general, securing by latching has the advantage that assembly is simple and reliable and also allows good maintenance access to the heat exchanger.

In an embodiment of the invention, the gas duct can be designed as a module of a modular system composed of standardized parts. In this way, relatively large quantities of the same module can be manufactured. In this context, the gas cooler according to the invention can also include an additional module of the modular system. The additional module preferably can be another gas cooler, in particular of identical design, so that different cooling capacities can be provided using the same module. Alternatively, the additional module can also be a gas intake housing or an intake manifold of the internal combustion engine.

Alternatively or in addition, the gas duct can be implemented as an intake manifold of the internal combustion engine, so that a connection to the intake ports of the engine and indirect gas cooling are provided as a structural unit.

Further advantages and features of the invention are evident from the exemplary embodiments described below, and from the dependent claims.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
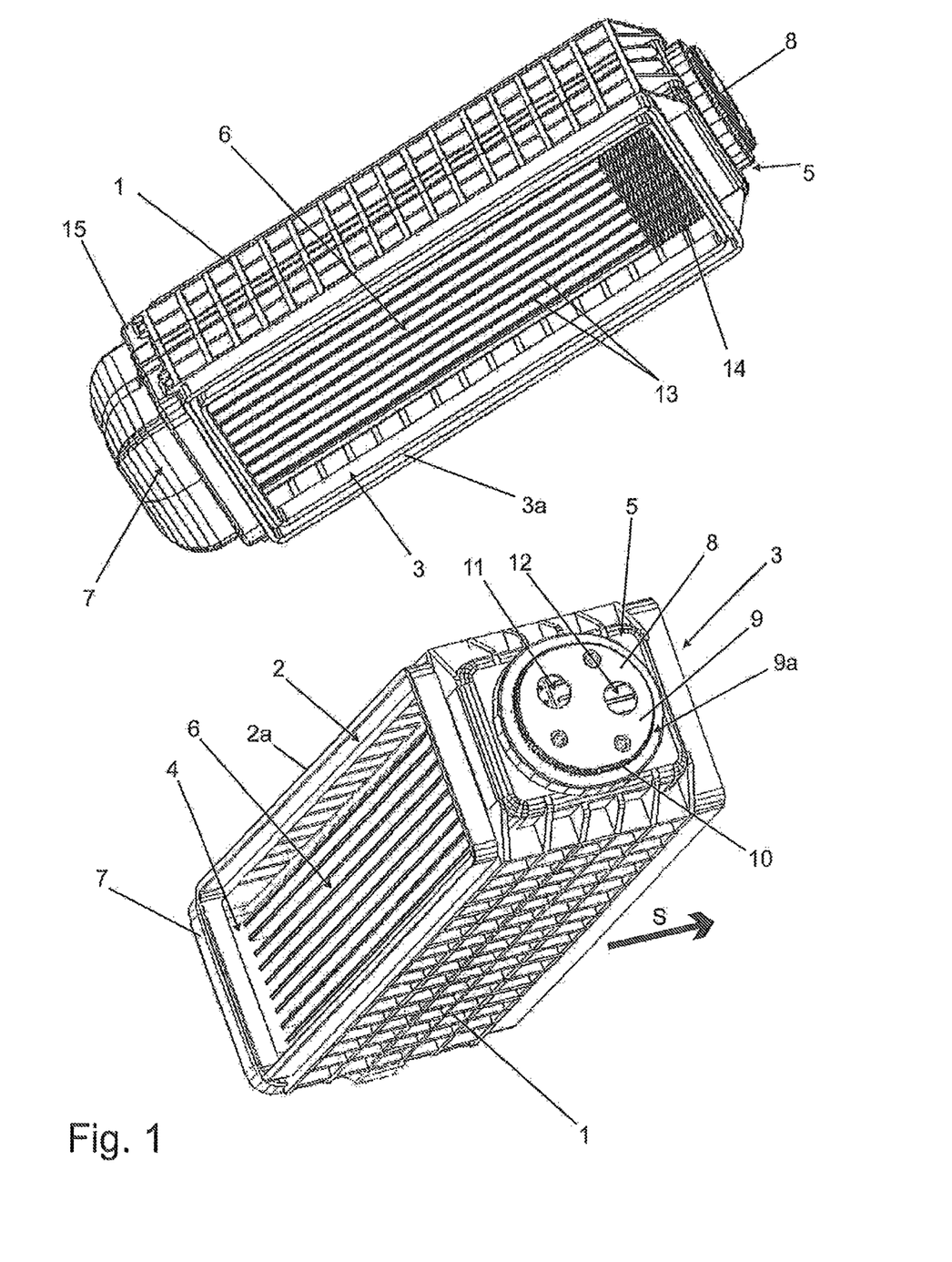
FIG. 1 shows two three-dimensional views of a first exemplary embodiment of a gas cooler according to the invention.

The gas cooler shown in FIG. 1 includes a gas duct 1 formed as a housing with an intake opening 2 and a discharge opening 3, for passage in a flow direction S of a gas flow. The gas is a charge air that is compressed by a turbocharger and mixed with recirculated exhaust gas to be delivered to an internal combustion engine (not shown).

In the gas duct 1, an opening 4 is provided in a first side wall that is parallel to the flow direction S; a heat exchanger 6 is inserted through this opening into the gas duct 1 perpendicular to the direction of flow. The heat exchanger 6 extends through the full width of the gas duct 1. It is fixed in place in the region of the opening 4 by means of a first header 7, and a header 8 at its front end extends into or through a second opening 5 of the gas duct located opposite the first opening 4.

The front header 8 has a box 9 with a step 9a, which in the present case is circular, on which rests an annular seal 10, by means of which the header 8 is supported against the second opening 5, which likewise is circular.

Two connections 11, 12 for supplying and removing a heat-carrying fluid of the heat exchanger, for example coolant from a low-temperature coolant circuit, are provided in the front header 8. In the present example, the connections are implemented only as circular holes, into which can be inserted plastic fittings, for example. However, connections of any desired construction may also be provided that are soldered, welded, or fastened in any other way.

The heat exchanger 6 has a soldered block made of flat tubes 13, between each of which layers of ribs 14 (only partially shown in FIG. 4) are soldered over their area, and each of which opens at its ends into passages in the bases 15, 16 of the headers 7, 8.

The first, rear header 7 has a cap-shaped box 17 that is soldered to an inner side of a protruding profiling 18 of the base 15. The profiling 18 is implemented as a double bend, so that an outer region of the profiling 18 is shaped like a U that is open in the insertion direction and engages around a protruding edge 4a of the opening 4. A seal can be placed in this profiling, for example.

Figure 2:
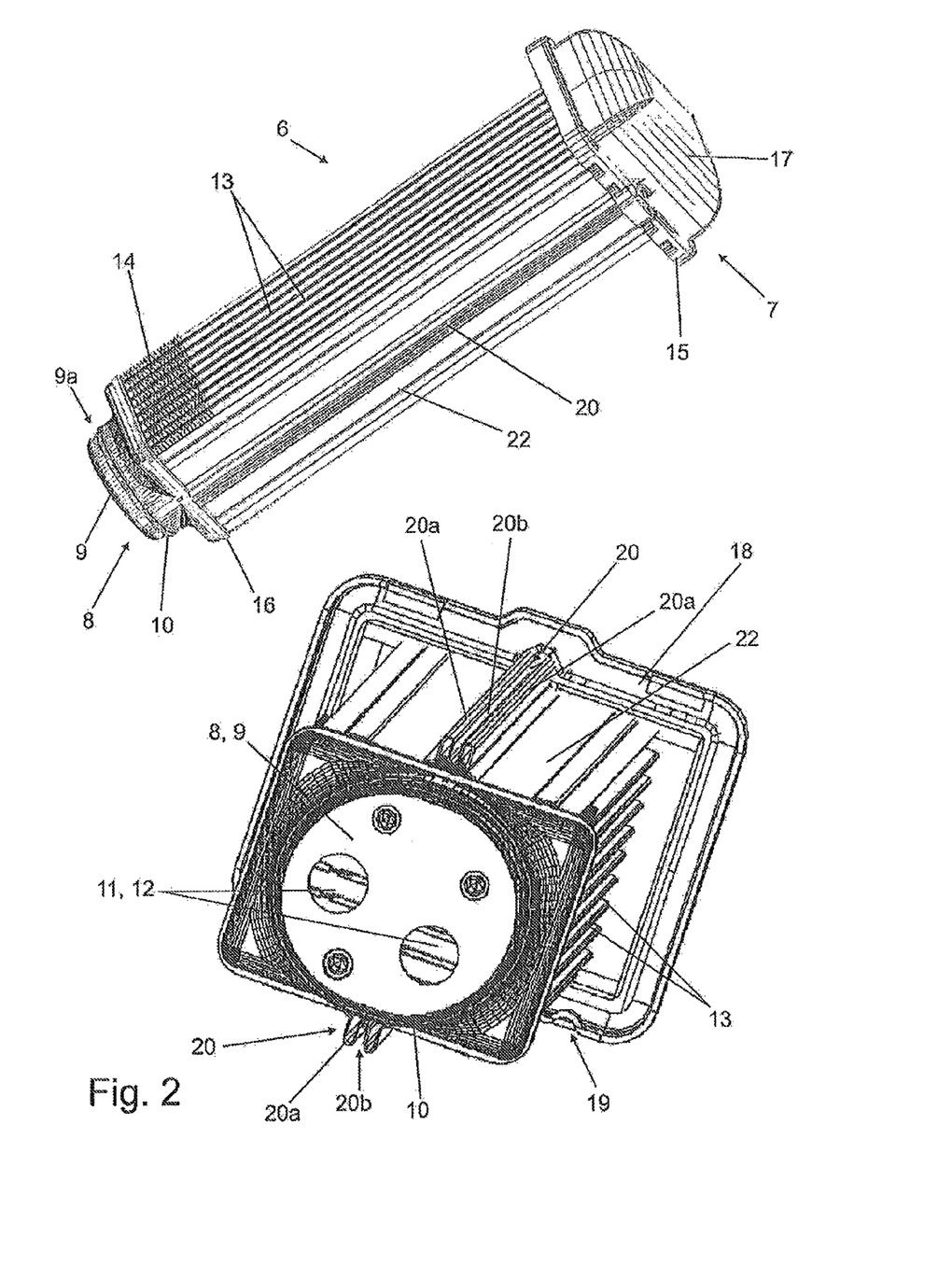
FIG. 2 shows two three-dimensional views of a heat exchanger from the gas cooler from FIG. 1.
Figure 3:
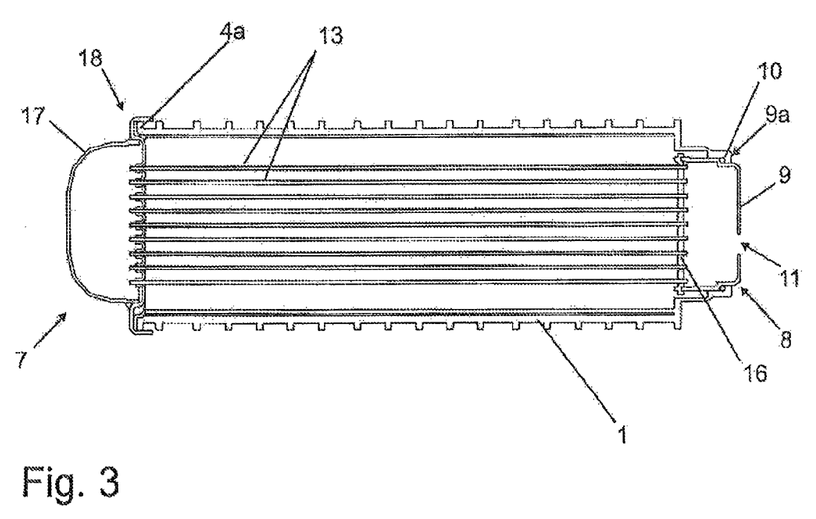
FIG. 3 shows a cross-sectional view through the gas cooler from FIG. 1.

The profiling 18 additionally has projections 19 (see FIG. 2) in the manner of a corrugated slot flange, with a latching to the opening 4 of the gas duct 1 being achieved by this means. The projections 19 slip behind a rim of the edge 4a of the opening 4 in this design.

To improve assembly and sealing, a first profile 20 is provided on the heat exchanger, and also a second profile 21 that meshes therewith is provided on the gas duct 1. These profiles 20, 21 each extend in the insertion direction of the heat exchanger, which in the present case is perpendicular to the flow direction S of the gas flow.

The first profile 20 is designed as a multiple folding of a central region of an aluminum sheet that forms a soldered side part 22 of the stack of flat tubes 13. In cross-section, the first profile 20 includes two adjacent, projecting beads 20a with a groove or corrugation 20b between them (see FIG. 2).

Figure 8:
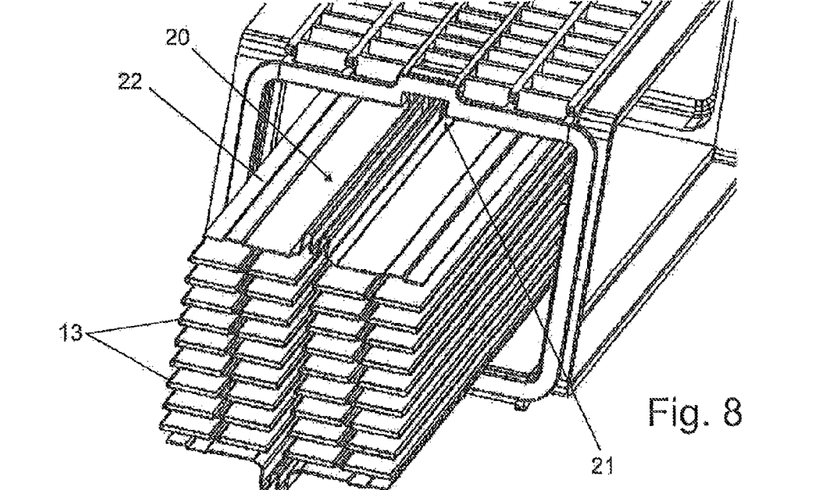
FIG. 8 shows a cutaway three-dimensional partial view of the gas cooler from FIG. 5.
Figure 9:
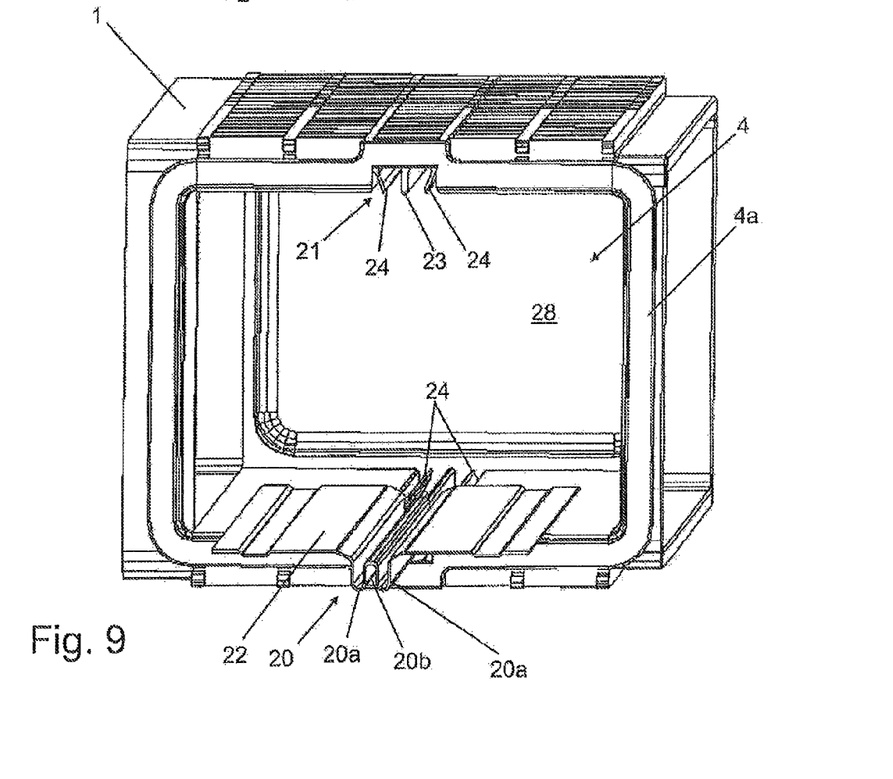
FIG. 9 shows another cutaway three-dimensional partial view of the gas cooler from FIG. 5.

The second profile 21 is formed in the gas duct 1, which is made of plastic as an injection-molded part. In this regard, reference is made to FIG. 8 and FIG. 9 of the second exemplary embodiment, which is identical to the first exemplary embodiment with respect to the design of the profiles 20, 21. While FIG. 8 shows the entire stack of flat tubes 13 and side parts 22 in the process of insertion into the gas duct, FIG. 9 shows only a section of the bottom side part in the lower region for purposes of illustration.

The second profile 21 is formed as a groove-like recess with a rectangular cross-section in the side wall of the gas duct 1. In the center of the rectangular groove 21, a central rib 23 projects that engages in the corrugation 20b of the first profile 20. The two profiles 20, 21 are meshed together in this way.

For clearance-free guidance and improved sealing against lateral leakage flows of the gas, two elastic sealing lips 24 are also provided in the groove; these sealing lips contact the outer sides of the two beads 20a. The sealing lips 24 and the rib 23 are formed of the same material as, and as a single piece with, the gas duct 1. It is a matter of course that the sealing lips or a unit having the sealing lips and rib can also be an inserted seal made of an elastic material.

In the present exemplary embodiments, a pair of meshing profiles 20, 21 is present on each of the opposite side walls, so that guidance and sealing take place on each side during insertion of the heat exchanger. With respect to the orientation in space, one of the groove-like second profiles 21 in each case is located on a lower side wall of the gas duct 1 viewed in the direction of gravity, so that the groove simultaneously serves as a sump for collecting any condensate occurring on the heat exchanger.

Appropriate openings for removing or drawing off the condensate (not shown) may be provided in the vicinity of the second profile. Depending on the layout and operation of the gas cooler, such an external condensate discharge is not necessary, however, since the condensate can also evaporate back into the gas flow.

Figure 4:
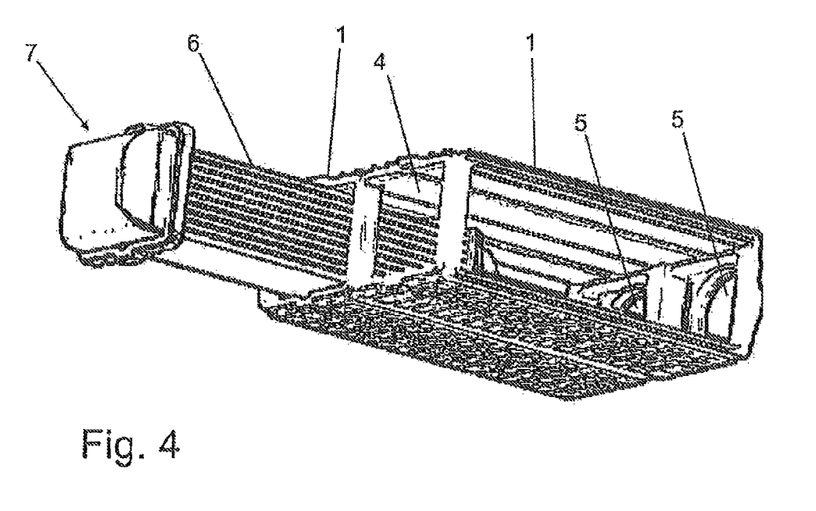
FIG. 4 shows a three-dimensional view of another exemplary embodiment of the invention.

The gas cooler 1, 6 is designed as a module of a modular system. FIG. 4 shows another exemplary embodiment in which a gas cooler according to the invention includes as a whole of two identical gas coolers 1, 6 from the preceding exemplary embodiment, which are placed adjacent to one another in the flow direction S. For purposes of illustration, a heat exchanger 6 is partially inserted into only one of the gas ducts 1. For easy combination of the modules 1, the intake and discharge openings 2, 3 of each gas duct are of standardized design, for example with protruding edges 2a, 3a in the manner of tongue 2a and groove 3a (see FIG. 1).

FIG. 5 through FIG. 9 show another exemplary embodiment of the invention that differs from the first exemplary embodiment in the construction of the heat exchanger 6. In contrast to the first exemplary embodiment, the heat exchanger 6 has only a single header 7 that is designed essentially like the first, rear header 7 in FIG. 1.

However, the two connections 11, 12 for the fluid are provided in the header 7 of the second exemplary embodiment, so that in addition a dividing wall (not shown) is provided inside the header to divide the header into a supply duct and a return duct.

A redirection in the heat exchanger 6, which is designed as a U-flow exchanger as in the first example, takes place in each one of the flat tubes 13 at its end opposite the header 7. For this purpose (see FIG. 10 in particular), the flat tubes 13 have a central division into at least two parallel chambers in the form of an indentation 25. The indentation 25 begins at the base 15 of the header 7 and terminates before a reversal region 26 at the end, in which the fluid flows from the supply duct to the return duct. The flat tubes 13 are manufactured from an essentially continuous profile, wherein an end closure is accomplished by means of a terminating indentation 27.

Figure 10:
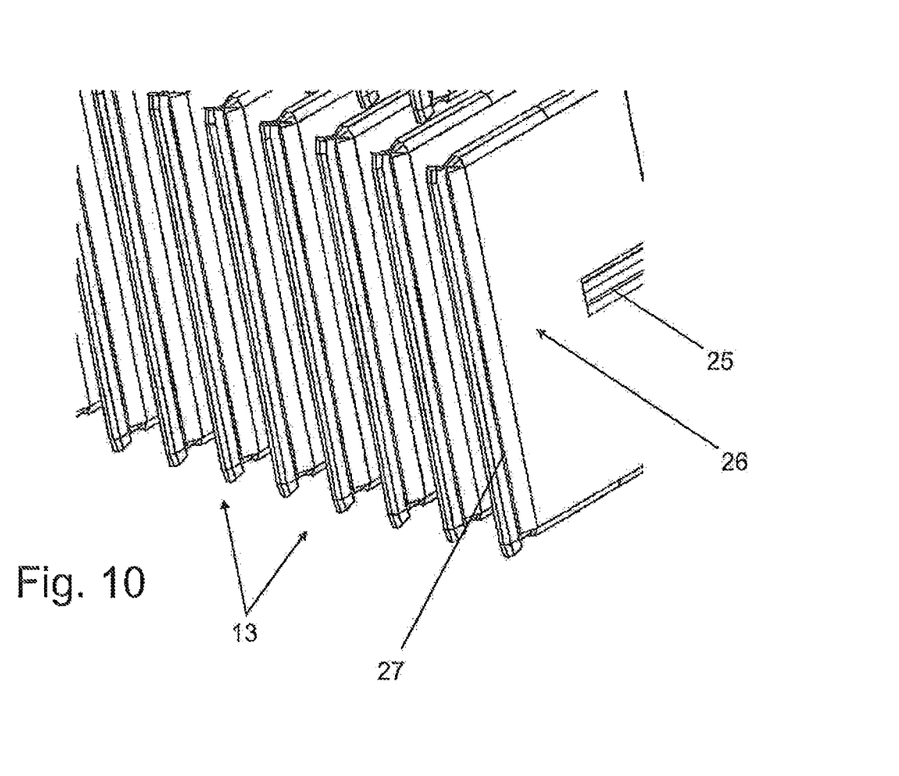
FIG. 10 shows a detail view of one end of flat tubes of the heat exchanger from FIG. 7.

The end of the stack of flat tubes of the heat exchanger 6 shown in FIG. 10 is accommodated in a closed recess 28 of the gas duct 1 of the second exemplary embodiment and is supported there on appropriate structures if applicable. In contrast to the first exemplary embodiment, the gas duct has no second opening (opening 5 in the first exemplary embodiment) opposite the first opening 4.

Figure 5:
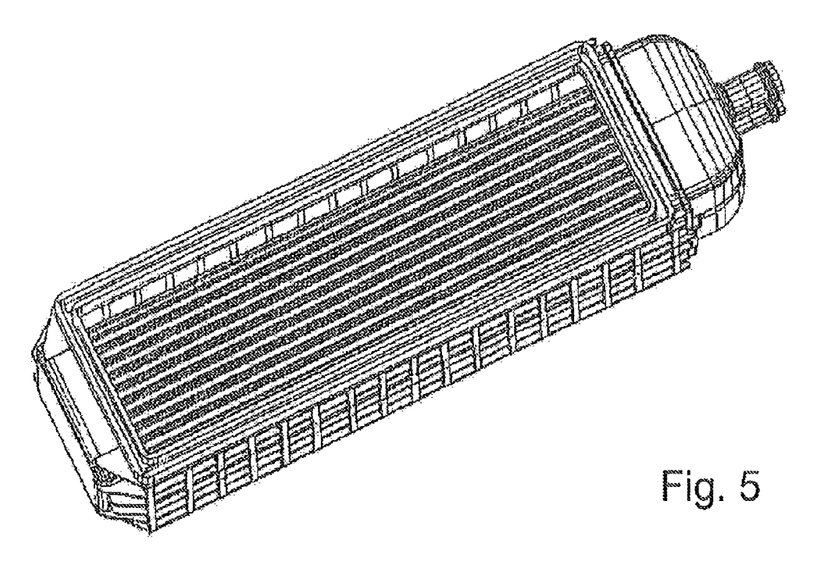
FIG. 5 shows two three-dimensional views of a second exemplary embodiment of a gas cooler according to the invention.
Figure 6:
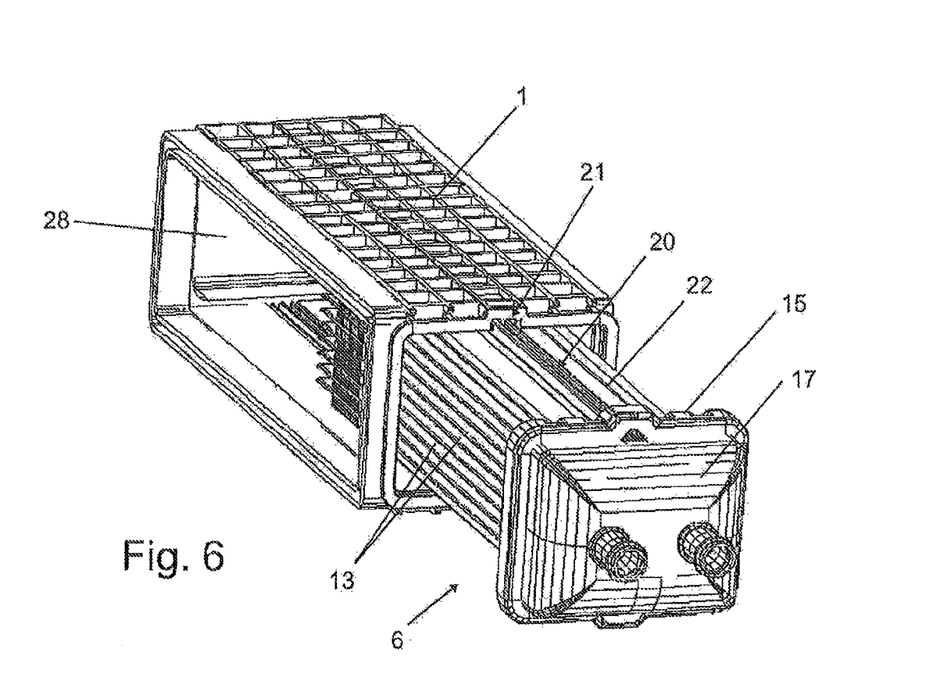
FIG. 6 shows a three-dimensional view of the gas cooler from FIG. 5 with heat exchanger pulled partially out.
Figure 7:
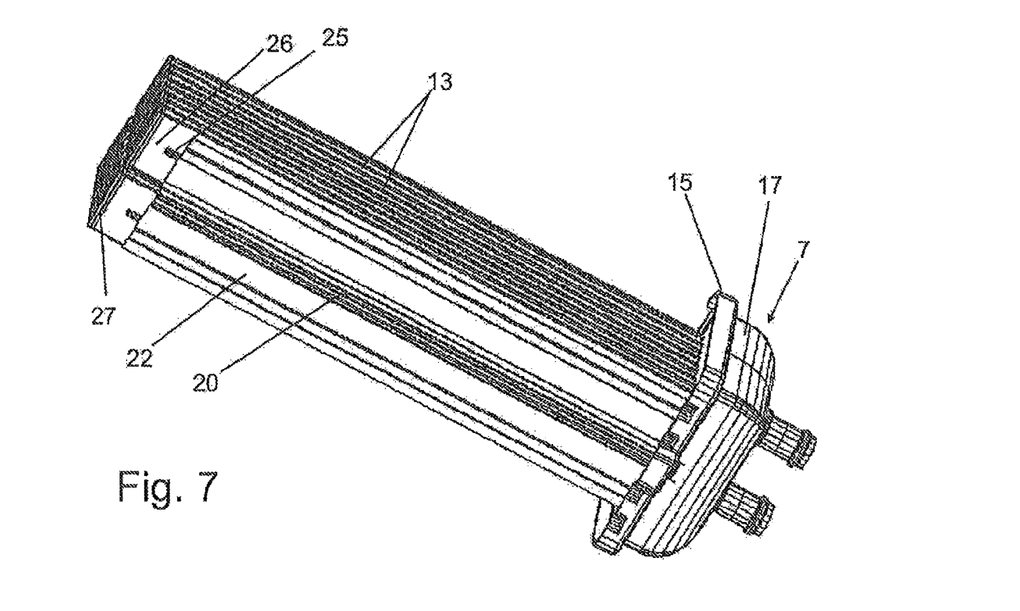
FIG. 7 shows the heat exchanger from FIG. 6.

The exemplary embodiments in FIG. 1 and FIG. 5 are identical with regard to the securing of the latching or securing of the heat exchanger 6 and the forming of the base 15, as well as the forming of the first and second profiles 20, 21.

In each of the exemplary embodiments, the heat exchanger 6 as a whole is manufactured as a block having flat tubes 13, ribs 14, and (at least one) header 7 with box 17 and base 15, soldered in a soldering oven. In the case of the exemplary embodiment in FIG. 1, this soldered block also includes the second header 8.

It is a matter of course that the individual features of the different exemplary embodiments may be appropriately combined with one another as required.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A gas cooler for an internal combustion engine, the gas cooler comprising:
   a gas duct for a passage in a flow direction of a gas flow that is supplied to the internal combustion engine;
   a heat exchanger arranged in the gas duct in an insertion direction through a lateral opening, wherein a fluid for cooling the gas flow is configured to flow through the heat exchanger; and
   a first profile formed on at least one side of the heat exchanger, the first profile extends in the insertion direction and is configured to mesh with a second profile that is arranged on the gas duct,
   wherein an elastic sealing lip is provided on at least one of the profiles or on the second profile to make contact with the respective other profile.

2. The gas cooler according to claim 1, wherein the sealing lip is an insertable seal or a single-piece forming of the gas duct.

3. A gas cooler for an internal combustion engine, the gas cooler comprising:
   a gas duct for a passage in a flow direction of a gas flow that is supplied to the internal combustion engine;
   a heat exchanger arranged in the gas duct in an insertion direction through a lateral opening, wherein a fluid for cooling the gas flow is configured to flow through the heat exchanger; and
   a first profile formed on at least one side of the heat exchanger, the first profile extends in the insertion direction and is configured to mesh with a second profile that is arranged on the gas duct,
   wherein the second profile is arranged in a lower region of the gas duct in a direction of gravity, so that the second profile forms a sump for receiving condensate.

\* \* \* \* \*